(12) United States Patent
Kappelmueller et al.

(10) Patent No.: US 10,960,508 B2
(45) Date of Patent: Mar. 30, 2021

(54) MACHINE ELEMENT

(71) Applicant: ENGEL AUSTRIA GmbH, Schwertberg (AT)

(72) Inventors: Werner Kappelmueller, Schwertberg (AT); Martin Poecheim, St. Andrae (AT); Johannes Bauer, St. Georgen im Walde (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 317 days.

(21) Appl. No.: 16/136,960

(22) Filed: Sep. 20, 2018

(65) Prior Publication Data

US 2019/0091822 A1  Mar. 28, 2019

(30) Foreign Application Priority Data

Sep. 22, 2017  (AT) .............................. A 50809/2017

(51) Int. Cl.
*F16N 31/00* (2006.01)
*B23Q 11/12* (2006.01)
(Continued)

(52) U.S. Cl.
CPC ........ *B23Q 11/123* (2013.01); *F16C 33/6625* (2013.01); *F16N 7/38* (2013.01);
(Continued)

(58) Field of Classification Search
CPC ..... F16C 33/6625; F16N 31/00; B23Q 11/123
See application file for complete search history.

(56) References Cited

U.S. PATENT DOCUMENTS 5,040,579 A * 8/1991 Kawamura ............. G01M 3/26
141/94
5,588,963 A * 12/1996 Roelofs ............... A61M 5/1689
604/65
(Continued)

FOREIGN PATENT DOCUMENTS

AT        509 983        1/2012
CN      202176622        3/2012
(Continued)

OTHER PUBLICATIONS

Search Report dated Dec. 13, 2019 in Chinese Patent Application No. 201811103590.5.
(Continued)

*Primary Examiner* — Michael R Mansen
*Assistant Examiner* — Mark K Buse
(74) *Attorney, Agent, or Firm* — Wenderoth, Lind & Ponack, L.L.P.

(57) ABSTRACT

A machine element, in particular for a shaping machine, includes a lubricated bearing and/or a seal and a primary drainage conduit for catching a fluid medium issuing from the bearing and/or the seal, preferably substantially pressure-lessly. A collecting device is provided for collecting the fluid medium which is caught in the primary drainage conduit over a period of time, and a measuring device is adapted to directly and/or indirectly measure an amount of the fluid medium collected by the collecting device over the period of time.

10 Claims, 2 Drawing Sheets

(51) Int. Cl.
*F16N 7/38* (2006.01)
*F16C 33/66* (2006.01)
*F16N 29/02* (2006.01)

(52) U.S. Cl.
CPC ............ *F16N 29/02* (2013.01); *F16N 31/00* (2013.01); *F16N 2210/14* (2013.01)

(56) References Cited

U.S. PATENT DOCUMENTS

| | | | | |
|---|---|---|---|---|
| 5,694,974 | A * | 12/1997 | Niemiro | B41F 31/022 137/358 |
| 5,922,941 | A * | 7/1999 | Winkler | B23Q 11/103 409/135 |
| 6,592,126 | B2 * | 7/2003 | Davis | F16J 15/004 137/312 |
| 7,692,553 | B2 * | 4/2010 | Kubala | B23Q 11/103 340/605 |
| 7,882,853 | B2 | 2/2011 | Mohr et al. | |
| 8,302,737 | B2 * | 11/2012 | Yanohara | F16C 33/6674 184/7.4 |
| 9,429,120 | B2 * | 8/2016 | Kifer | F02M 51/005 |
| 2003/0197368 | A1 * | 10/2003 | Reifschneider | F28F 5/02 285/121.6 |
| 2007/0034265 | A1 * | 2/2007 | Mohr | F16L 27/0828 137/580 |
| 2007/0221054 | A1 * | 9/2007 | Webster | F15B 15/1409 91/394 |
| 2007/0256580 | A1 | 11/2007 | Schoppe | |
| 2008/0110700 | A1 * | 5/2008 | Yanohara | F16C 33/6674 184/7.4 |
| 2013/0284539 | A1 * | 10/2013 | Kobayashi | F03D 80/70 184/7.4 |
| 2014/0117118 | A1 | 5/2014 | Kifer et al. | |
| 2016/0121518 | A1 | 5/2016 | Holler | |

FOREIGN PATENT DOCUMENTS

| | | |
|---|---|---|
| CN | 202301431 | 7/2012 |
| CN | 102829314 | 12/2012 |
| CN | 202867570 | 4/2013 |
| CN | 104903568 | 9/2015 |
| CN | 206129889 | 4/2017 |
| DE | 43 32 028 | 12/2001 |
| DE | 10 2007 054 446 | 5/2008 |
| DE | 10 2011 110 822 | 2/2012 |
| EP | 0 799 670 | 10/1997 |
| JP | 55-51313 | 4/1980 |
| JP | 57-184397 | 11/1982 |
| JP | 11-179631 | 7/1999 |
| JP | 2005-522659 | 7/2005 |
| JP | 2007-51775 | 3/2007 |
| JP | 2012-67906 | 4/2012 |
| JP | 2013-228063 | 11/2013 |
| JP | 2016-516619 | 6/2016 |
| WO | 2005/077639 | 8/2005 |

OTHER PUBLICATIONS

English Translation of Office Action dated Oct. 7, 2019 in corresponding Korean Patent Application No. 10-2018-0108257.

* cited by examiner

MACHINE ELEMENT

BACKGROUND OF THE INVENTION

The present invention concerns a machine element, in particular for a shaping machine, having a lubricated bearing and/or a seal and at least one drainage conduit for catching a fluid medium issuing from the bearing and/or the seal, preferably substantially without pressure, and a corresponding method.

The state of the art is illustrated hereinafter by reference to the example of a rotary feedthrough.

Rotary feedthroughs as are used in particular in shaping machines like, for example, injection moulding machines make it possible to circulate a medium, in particular a fluid medium, that is to say a gaseous or liquid medium, to be transmitted from a component to a shaft which rotates in relation to the component.

The fluid medium passages of those rotary feedthroughs are provided with annular seals on the one hand to prevent the fluid medium from issuing (leaking) from the fluid medium passage and on the other hand to prevent the medium from being contaminated by oil or grease coming from the lubrication for the shaft bearing means.

It will be appreciated that, depending on the operating hours of the bearing locations or seals, leakage occurs both of the lubricant and also of the fluid medium. Drainage conduits are provided for that purpose, and the drainage conduits open for example into a container.

It is also known in the state of the art to provide pressure sensors in the drainage conduits. By virtue thereof, the operator of the installation can be warned if damage to the rotary feedthrough has occurred, and as a result larger amounts of lubricant or fluid medium issue and possibly contaminate each other.

Admittedly, that system relatively reliably provides information about damage or at least increased leakage at the rotary feedthrough. If, however, the pressure in the drainage conduit is already increased, the risk of mutual contamination naturally already arises (that is to say, in general, damage has already occurred).

SUMMARY OF THE INVENTION

The object of the invention therefore is to provide a rotary feedthrough in which impending damage or at least an increase in a leakage rate can already be detected, as well as providing a corresponding method.

That object is effected by at least one collecting device for collecting the medium which is caught in the drainage conduit over a period of time, and a measuring device adapted to directly and/or indirectly measure an amount of the medium collected by the collecting device over the period of time.

That is effected by medium issuing from the bearing and/or the seal being collected over the period of time, and the amount of the medium collected over the period of time being directly and/or indirectly measured.

The invention can therefore be used not only in rotary feedthroughs, but quite generally in relation to machine elements having a lubricated bearing and/or any machine elements having seals, that is to say in particular in almost any kind of rolling bearings and/or plain bearings.

The fluid medium which is carried away by the drainage conduit can be lubricant from the bearing, media in relation to which the seal provides sealing integrity, or mixtures thereof. In other words, anything which can issue from a seal and/or a bearing is deemed to be a fluid medium in accordance with the invention.

A basic aspect of the invention provides collecting an amount of the issuing medium with the collecting device, which makes it possible to carry out measurement of the amount with reasonable accuracy. As in general, the issuing medium is substantially pressure-less (without pressure in comparison with the ambient pressure) direct volume flow measurement can normally not be carried out with acceptable accuracy. (The volume flows can be in the region of ml/month.)

It is therefore possible to detect increased leakage at an early time—and thus inter alia also detect damage to the corresponding machine component at an early time. Bearings and/or seals can thus be subjected to "condition monitoring".

The apparatus according to the invention can be adapted to measure the amount of the fluid medium collected by the collecting device during and/or after the period of time, wherein the period of time is preferably established in advance. For example, the drainage conduit can be shut off by a stop valve and periodically emptied by brief opening thereof. If a pressure sensor is available (which is in the normal situation present in any case), it is possible to conclude about the amount of leakage on the basis of the information as to how fast the pressure rises. If, for example, after emptying of the drainage conduit the pressure rises significantly faster than was previously the case, it is possible to initiate maintenance or a change of the corresponding machine element.

As a measurement of the leakage rate, however, it is also possible to use a measured period of time which elapses until a predefined amount of the medium is collected. In particular, the measuring device is adapted on the one hand to measure a property, that varies with the amount of the collected medium, of the fluid medium which is collected by the collecting device and on the other hand to measure the period of time. A measurement value of the period of time at a moment in time at which a measurement value of the property of the collected medium reaches and/or exceeds a limit value serves as a measurement in respect of the amount of the medium collected over the period of time.

That can be achieved, for example, by a pressure limiting valve. Normal leakage means that the pressure in the drainage conduit rises slowly. If the pressure exceeds the limit pressure of the pressure limiting valve, the valve is opened and the pressure falls in the drainage conduit. The latter can be detected again by a pressure sensor or the like. If the frequency at which the pressure limiting valve responds rises, it is possible to assume that there is increased leakage and maintenance or a change in the machine element can be initiated.

In general, the amount of collected medium, however it is measured, can be observed, and then maintenance or replacement of the machine element can be carried out if the amount per unit of time (or alternatively the period of time per unit of amount) rises significantly.

Examples of machine elements which can be monitored according to the invention would be a hydraulic cylinder having at least one sealed pressure chamber or a rotary feedthrough which preferably has a plurality of mutually sealed media conduits.

In particular, in the latter case, there are separate drainage conduits for the various media conduits. That, however, is possible not just in relation to rotary feedthroughs. Whenever there are a plurality of various media or a plurality of various locations at which the medium issues on a machine element, separate drainage conduits can be used.

If there are a plurality of (separate) drainage conduits, respective separate collecting devices can be associated therewith. In that way, it is possible to quickly and easily find out where precisely an increased leak is occurring.

In a particularly simple configuration, the separate drainage conduits can naturally also be brought together to a main drainage conduit, in which case then the collecting device can be arranged in and/or at the main drainage conduit.

The collecting device can have at least one of the following:
  a stop valve arranged in the drainage conduit,
  a pressure limiting valve arranged in the drainage conduit, and/or
  a container connected to the drainage conduit.

In a quite simple configuration, however, measurement of the collected medium could also be implemented by visual checking at a corresponding collecting container. The measuring device would then be implemented by a viewing window on the corresponding collecting container or by a transparent collecting container.

For the purposes of this document, the expression container connected to the drainage conduit is used to mean any container in which a fluid of the drainage conduit opens without support from the exterior. The possibility of providing a pressure sensor for detecting a pressure in the drainage conduit and using it as a measuring device in accordance with the invention has already been mentioned.

A shaping machine can have a machine element according to the invention.

Herein, the term "shaping machines" means injection moulding machines, injection presses, presses and the like.

BRIEF DESCRIPTION OF THE DRAWINGS

Further advantages and details of the invention will be apparent from the specific description below in connection with the drawings, in which.

DETAILED DESCRIPTION OF THE INVENTION

Figure 1A:
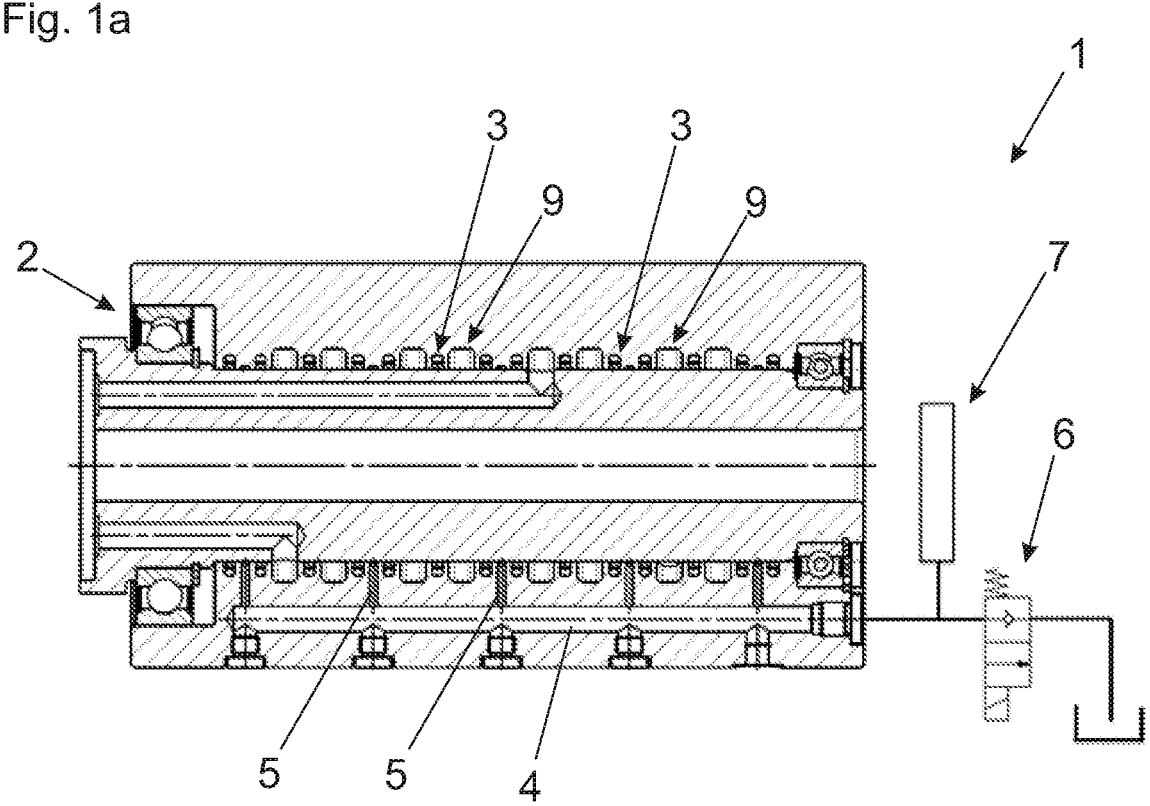
FIG. 1a shows a first embodiment of a rotary feedthrough according to the invention.

The machine element 1 shown in FIG. 1a is a rotary feedthrough or union. It has a plurality of fluid medium passages 9 which are sealed off relative to each other by seals 3.

Figure 1B:
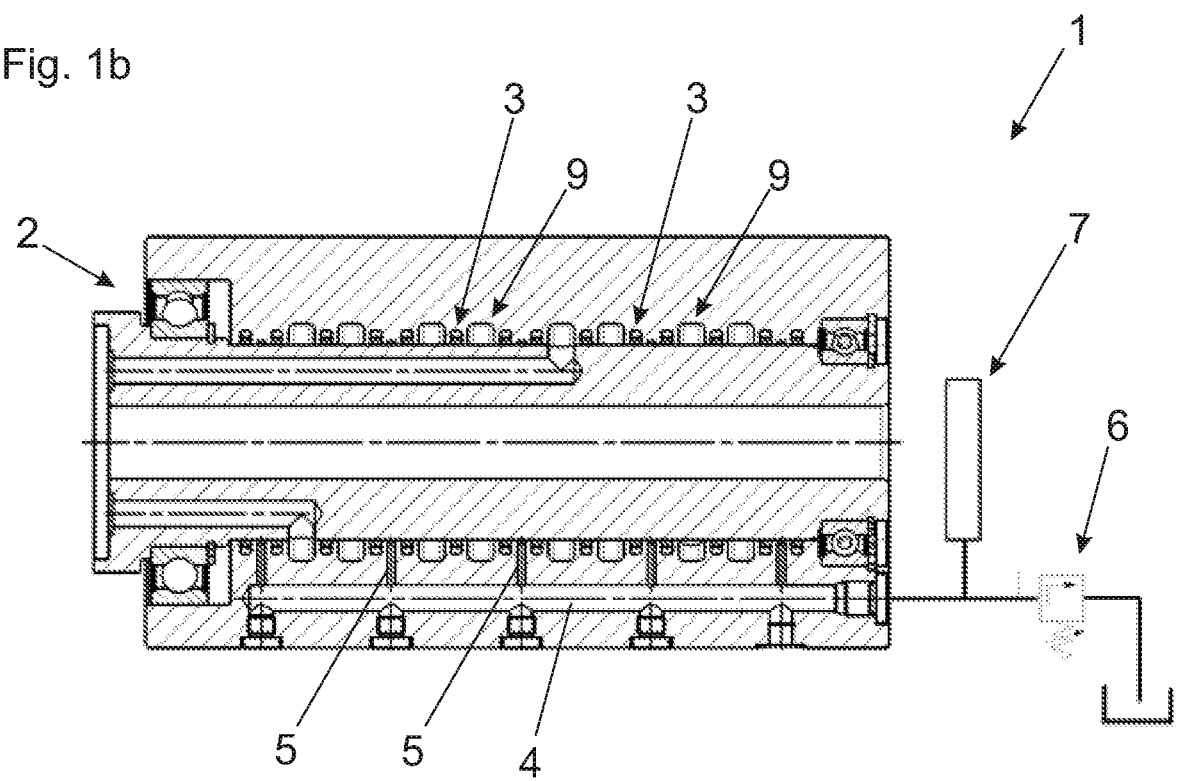
FIG. 1b shows a second embodiment of a rotary feedthrough according to the invention.

There are also a plurality of separate primary drainage conduits 5 which all open (feed) into a main drainage conduit 4. As shown in FIGS. 1a and 1b, the separate primary drainage conduits 5 are arranged in parallel and spaced apart along a longitudinal axis of the machine element (i.e., spaced apart along the longitudinal axis of the rotary feedthrough or union) so as to separately feed directly into the main drainage conduit 4.

In that respect, it is to be mentioned that the main drainage conduit 4 can be composed of a main drainage passage in a component of the rotary feedthrough and a flexible or non-flexible conduit portion connected thereto, like for example a tube or a hose. In the present embodiment, a stop valve which for example is in the form of a two-way valve serves as the collecting device 6. A corresponding stop valve can be actuated electrically or electronically, in which respect theoretically it is also possible to use a hand-operated stop valve. In addition, there is a measuring device in the form of a pressure sensor.

The stop valve can be opened at regular intervals, and thereafter it is possible by the pressure sensor to observe how quickly the pressure rises. If that occurs significantly faster than in previous observation cycles, it is to be assumed that there is increased leakage.

It is to be noted that not all seals 3, fluid medium passages 9 and primary drainage passages 5 are provided with reference numerals in order to maintain clarity of the drawing.

FIG. 1b is a view similar to that of FIG. 1a, with the collecting device 6 having a different configuration.

More specifically, in FIG. 1b the collecting device 6 is formed by a pressure limiting valve. The pressure limiting valve can be set, for example, to about 0.5 bar above ambient pressure. When that pressure in the main drainage conduit 4 is reached, the pressure limiting valve 6 opens and the pressure in the main drainage conduit 4 falls—together with the primary drainage conduits 5. That opening of the pressure limiting valve can be detected as a drop in pressure by the pressure sensor (measuring device 7). If the time between those activations of the stop valve decreases significantly, it can also be assumed that there is increased leakage.

Figure 2A:
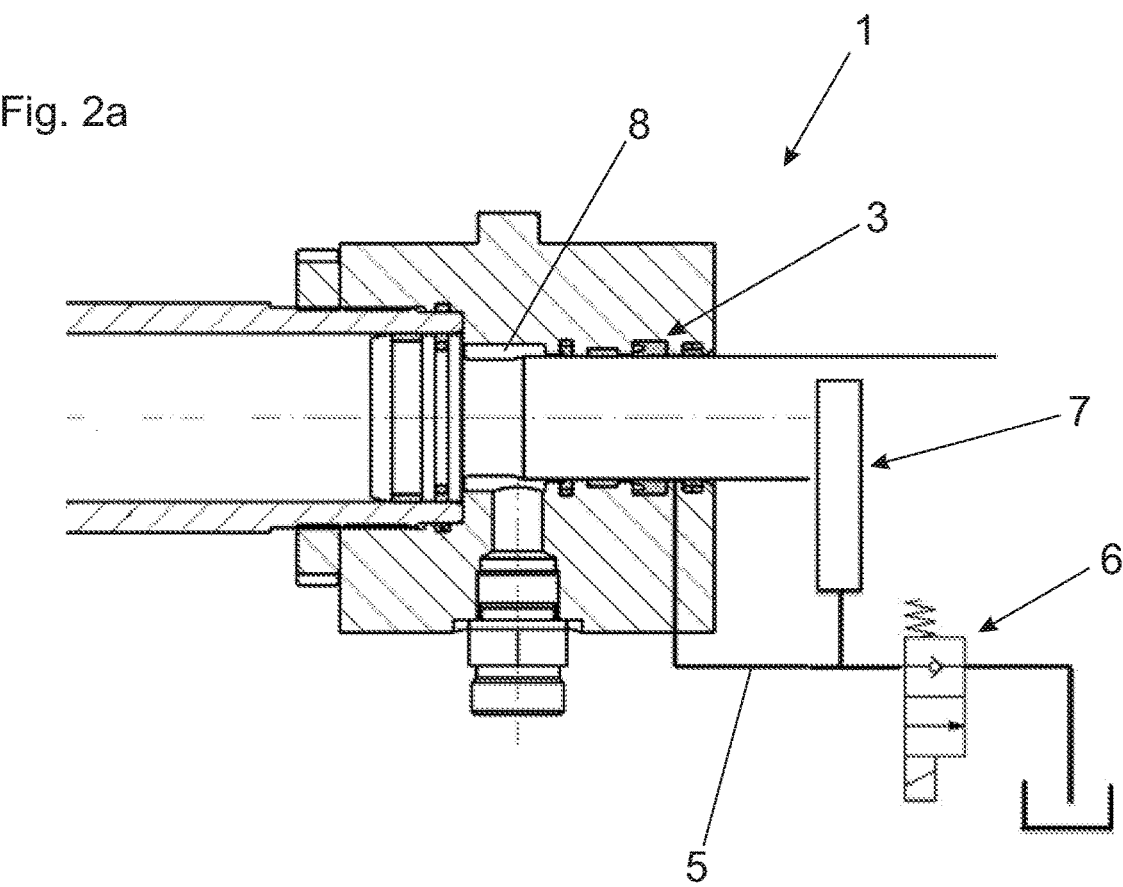
FIG. 2a shows an embodiment of a hydraulic cylinder according to the invention.

FIG. 2a shows an embodiment of the invention, the machine element 1 being a hydraulic cylinder having at least one sealed pressure chamber 8. At the side of the pressure chamber 8 remote from the seal 3, the drainage conduit 5 leads away, with pressure fluid medium—in this case, primarily hydraulic fluid medium from the pressure chamber 8—being caught in the drainage conduit 5.

The collecting device 6 and measuring device 7 according to the embodiment of FIG. 2a have a similar structure to the embodiment of FIG. 1a. Naturally, it would also be possible to carry out measurement of the leakage rate as in FIG. 1b. Further examples are described in relation to FIG. 2b.

Figure 2B:
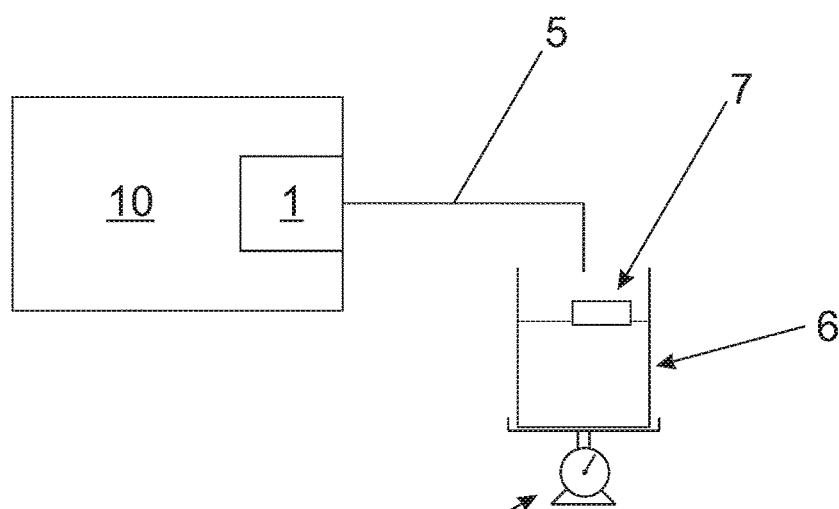
FIGS. 2b and 2c are symbolic views of various configurations of a shaping machine according to the invention.

FIG. 2b is a purely diagrammatic view of a shaping machine 10 having a machine element 1 and a drainage conduit 5. Connected to the drainage conduit 5 is a container in which the fluid medium leaking from the machine element 1 is collected, that is to say the container forms the collecting device 6. Two examples of possible ways of detecting the amount of fluid medium in the container are illustrated. This would be, on the one hand, detecting the volume of the fluid medium in the container by a float 7. (It will be appreciated that the level of the float has to be detected by a separate or integrated device. That, however, is not shown in the diagrammatic view in FIG. 2b.)

The second example would be a weighing device as the measuring device 7, on which the container is arranged. The mass of the medium in the container or a similar value can be detected by the weighing device.

The embodiment illustrated in FIG. 2b with the alternative measuring devices 7 can be used both with a measuring specification with a previously predetermined period of time and also with a limit value for the volume or mass.

Figure 2C:
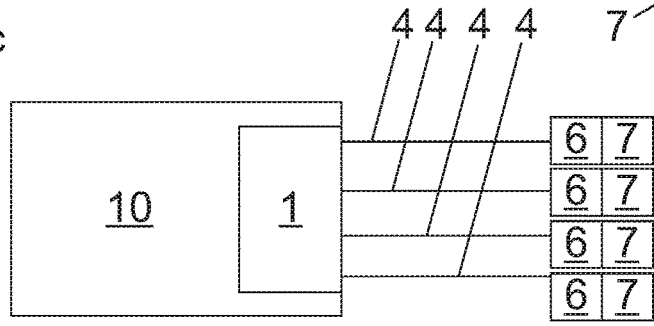

FIG. 2c diagrammatically shows an embodiment of the invention in which a machine element 1 of a shaping machine 10 has a plurality of separate drainage passages 4. Each separate drainage passage 4 is connected for that purpose to a combination of collecting device 6 and measuring device 7 so that in this embodiment it is possible to precisely ascertain from which of the separate drainage passages 4 an increased leakage is coming. If an embodiment as shown FIG. 2c is implemented in an embodiment as shown in FIG. 1a or FIG. 1b, it would thus be possible to establish the fluid medium passages 9 from which the increased leakage is originating.

LIST OF REFERENCES

Machine element 1
Bearing 2
Seal 3
Main drainage conduit 4
Separate primary drainage conduits 5
Collecting device 6
Measuring device 7
Pressure chamber 8
Media conduit 9
Shaping machine

The invention claimed is:

1. A rotary feedthrough for use in a shaping machine, the rotary feedthrough comprising:
   a plurality of sealed fluid medium conduits and seals between the fluid medium conduits;
   a plurality of separate primary drainage conduits for receiving a fluid medium issuing past the seals of the fluid medium conduits;
   a main drainage conduit communicating with the primary drainage conduits to receive the fluid medium from the primary drainage conduits;
   a collecting device at the main drainage conduit for receiving and collecting the fluid medium from the main drainage conduit; and
   a measuring device configured to measure an amount of the fluid medium received and collected by the collecting device over a period of time.

2. The rotary feedthrough according to claim 1, wherein the measuring device is configured to measure the amount of the fluid medium collected by the collecting device during and/or after the period of time, the period of time being set in advance.

3. The rotary feedthrough according to claim 1, wherein the measuring device is configured to:
   measure a property of the fluid medium collected by the collecting device, the property varying with the amount of the collected medium; and
   measure the period of time, wherein a measurement value of the period of time at a moment in time at which a measurement value of the property of the collected fluid medium reaches a limit value serves as a measurement with respect to the amount of the medium collected over the period of time.

4. The rotary feedthrough according to claim 1, wherein the collecting device includes at least one of a group consisting of:
   a stop valve arranged in the main drainage conduit;
   a pressure limiting valve arranged in the main drainage conduit; and
   a container connected to the main drainage conduit.

5. The rotary feedthrough according to claim 1, wherein the measuring device includes a pressure sensor for detecting a pressure in the main drainage conduit.

6. The rotary feedthrough according to claim 1, wherein each of the fluid medium conduits is sealed by at least one of the seals, and each of the primary drainage conduits is arranged to receive the fluid medium leaking past at least one of the seals, each of the primary drainage conduits being directly connected to the main drainage conduit.

7. The rotary feedthrough according to claim 6, wherein the primary drainage conduits are arranged in parallel and spaced apart along a longitudinal axis of the rotary feedthrough so as to separately feed into the main drainage conduit.

8. The rotary feedthrough according to claim 1, wherein the primary drainage conduits are arranged in parallel and spaced apart along a longitudinal axis of the rotary feedthrough so as to separately feed into the main drainage conduit.

9. A shaping machine having the rotary feedthrough according to claim 1.

10. A method of determining an amount of a fluid medium issuing over a period of time from a rotary feedthrough of a shaping machine, the method comprising:
    providing a plurality of sealed fluid medium conduits and seals between the fluid medium conduits;
    providing a plurality of separate primary drainage conduits for receiving the fluid medium issuing past the seals of the fluid medium conduits;
    arranging a main drainage conduit communicating with the primary drainage conduits to receive the fluid medium from the primary drainage conduits;
    collecting the fluid medium from the main drainage conduit in a collecting device; and
    measuring an amount of the fluid medium collected by the collecting device over a period of time using a measuring device.

\* \* \* \* \*